(12) United States Patent
Hasegawa et al.

(10) Patent No.: US 8,871,073 B2
(45) Date of Patent: Oct. 28, 2014

(54) ELECTRODEIONIZATION APPARATUS FOR PRODUCING DEIONIZED WATER

(75) Inventors: Kazuya Hasegawa, Tokyo (JP); Yuji Asakawa, Tokyo (JP); Keisuke Sasaki, Tokyo (JP)

(73) Assignee: Organo Corporation, Tokyo (JP)

( * ) Notice: Subject to any disclaimer, the term of this patent is extended or adjusted under 35 U.S.C. 154(b) by 56 days.

(21) Appl. No.: 13/701,819

(22) PCT Filed: May 20, 2011

(86) PCT No.: PCT/JP2011/061628
§ 371 (c)(1),
(2), (4) Date: Dec. 3, 2012

(87) PCT Pub. No.: WO2011/152226
PCT Pub. Date: Dec. 8, 2011

(65) Prior Publication Data
US 2013/0068624 A1    Mar. 21, 2013

(30) Foreign Application Priority Data
Jun. 3, 2010    (JP) ................. 2010-127758

(51) Int. Cl.
| | |
|---|---|
| *B01D 61/48* | (2006.01) |
| *C02F 1/469* | (2006.01) |
| *B01D 61/44* | (2006.01) |
| *B01D 57/02* | (2006.01) |
| *C02F 1/42* | (2006.01) |
| *C02F 1/461* | (2006.01) |

(52) U.S. Cl.
CPC ......... *C02F 1/4695* (2013.01); *C02F 2001/427* (2013.01); *B01D 61/48* (2013.01); *C02F 2201/46115* (2013.01); *C02F 2001/46133* (2013.01); *C02F 2303/22* (2013.01); *B01D 61/445* (2013.01); *B01D 57/02* (2013.01); *C02F 2001/425* (2013.01); *C02F 2201/4618* (2013.01); *C02F 2001/422* (2013.01)
USPC ........................................................ 204/632

(58) Field of Classification Search
USPC ................................................ 204/632, 524
See application file for complete search history.

(56) References Cited

U.S. PATENT DOCUMENTS

| | | | |
|---|---|---|---|
| 2004/0168968 | A1 | 9/2004 | Chidambaran et al. |
| 2007/0278099 | A1 | 12/2007 | Barber |

(Continued)

FOREIGN PATENT DOCUMENTS

| | | |
|---|---|---|
| EP | 1384746 A1 | 1/2004 |
| JP | 01-151911 | 6/1989 |

(Continued)

OTHER PUBLICATIONS

Extended European Search Reported dated Feb. 7, 2014 in corresponding EP Application No. 11789635.7.

*Primary Examiner* — Arun S Phasge

(74) *Attorney, Agent, or Firm* — Knobbe Martens Olson & Bear LLP

(57) ABSTRACT

An electrodeionization apparatus for producing deionized water comprises a deionization treatment unit including deionization chamber D and a pair of concentration chambers C1 and C2 placed adjacent to deionization chamber D on opposite sides thereof and those concentration chambers are filled with anion exchangers. The deionization chamber D is partitioned by an ion exchange membrane into first small deionization chamber D-1 adjacent to concentration chamber C1 and second small deionization chamber D-2 adjacent to concentration chamber C2. First small deionization chamber D-1 is filled with an anion exchanger. Second small deionization chamber D-2 is filled with an anion exchanger and a cation exchanger in a sequence such that the ion exchanger, through which water that is to be treated finally passes, is the anion exchanger.

4 Claims, 9 Drawing Sheets

(56) References Cited

U.S. PATENT DOCUMENTS

2008/0067069 A1 3/2008 Gifford et al.
2008/0073215 A1* 3/2008 Barber et al. ................ 204/634

FOREIGN PATENT DOCUMENTS

| JP | 2000-301156 A | 10/2000 |
| JP | 2001-079358 | 3/2001 |
| JP | 2001-225078 | 8/2001 |
| JP | 2002-001345 | 1/2002 |
| JP | 2008-055388 | 3/2008 |
| JP | 2010-264360 | 11/2010 |
| JP | 2011-062662 | 3/2011 |
| WO | 02/04357 A1 | 1/2002 |
| WO | 20071149574 A2 | 12/2007 |
| WO | 2010/104007 A1 | 9/2010 |

* cited by examiner (a)

(b)

(c)

(d)

ELECTRODEIONIZATION APPARATUS FOR PRODUCING DEIONIZED WATER

CROSS-REFERENCE TO RELATED APPLICATIONS

This application is the U.S. National Phase under 35. U.S.C. §371 of International Application PCT/JP2011/061628, filed May 20, 2011, which claims priority to Japanese Patent Application No. 2010-127758, filed Jun. 3, 2010. The disclosures of the above-described applications are hereby incorporated by reference in their entirety. The International Application was published under PCT Article 21(2) in a language other than English.

TECHNICAL FIELD

The present invention relates to an electrodeionization apparatus for producing deionized water and, more particularly, to a structure of a deionization chamber.

BACKGROUND ART

Deionization apparatuses for producing deionized water are known in which deionization is performed by passing water to be treated through ion exchangers. In such production apparatuses, there is a need to regenerate ion exchange groups in the ion exchangers with chemicals (alkali or acid) when the deionization performance is reduced due to saturation of the ion exchange groups. More specifically, it is necessary to replace anions and cations adsorbed to the ion exchange groups with $H^+$ derived from an acid and $OH^-$ derived from an alkali, respectively. In recent years, electrodeionization apparatuses for producing deionized water that do not need regeneration with chemicals have been developed and put into practical use to overcome the operational drawback described above.

An electrodeionization apparatus for producing deionized water is an apparatus using a combination of electrophoresis and electrodialysis. The basic construction of an ordinary electrodeionization apparatus for producing deionized water is as described below. That is, the electrodeionization apparatus for producing deionized water has a deionization chamber, a pair of concentration chambers placed on opposite sides of the deionization chamber, an anode chamber placed outside one of the concentration chambers, and a cathode chamber placed outside the other concentration chamber. The deionization chamber has an anion exchange membrane and a cation exchange membrane opposite to each other and an ion exchanger (an anion exchanger and/or a cation exchanger) filled between these exchange membranes. In the following description, an electrodeionization apparatus for producing deionized water is sometimes referred to simply as "deionized water producing apparatus".

To produce deionized water with a deionized water producing apparatus of the above-described construction, water to be treated is passed through the deionization chamber in a state where a direct current voltage is applied between electrodes respectively provided in the anode and cathode chambers. In the deionization chamber, anion components (e.g., $Cl^-$, $CO_3^{2-}$, $HCO_3^-$ and $SiO_2$) are captured by an anion exchanger and cation components (e.g., $Na^+$, $Ca^{2+}$ and $Mg^{2+}$) are captured by a cation exchanger. Simultaneously, water-splitting reaction occurs at the interface between the anion exchanger and the cation exchanger in the deionization chamber, thereby generating hydrogen ions and hydroxide ions ($2H_2O \rightarrow H^+ + OH^-$). The ion components captured by the ion exchangers are liberated from the ion exchangers by substitution of the hydrogen and hydroxide ions for the ion components. The liberated ion components move to the ion exchange membrane (anion exchange membrane or cation exchange membrane) through the ion exchanger by electrophoresis, undergo electrodialysis in the ion exchange membrane and move into the concentration chamber. The ion components having moved into the concentration chamber are discharged by water flowing in the concentration chamber.

In the electrodeionization apparatus for producing deionized water, as described above, hydrogen ions and hydroxide ions continuously act as regenerants (an acid and an alkali) for regenerating the ion exchangers. There is, therefore, basically no need to regenerate the ion exchangers with chemicals, and the apparatus can operate continuously.

However, when the deionized water producing apparatus is continuously operated, hardness components in water to be treated precipitate to generate scales, such as calcium carbonate or magnesium hydroxide. Scales are generated particularly on the concentration-chamber-side surface of the anion exchange membrane interposed between the cathode chamber and the concentration chamber (see FIG. 8). In a case where a plurality of deionization chambers are provided, scales are generated on the surface of the anion exchange membrane in the concentration chamber located between two of the deionization chambers (see FIG. 9). This is for the reason described below. Due to passage of hydroxide ions generated by electrolysis in the cathode chamber or hydroxide ions generated by water-splitting reaction in the deionization chamber, the anion exchange membrane surface in the concentration chamber becomes alkaline. The hardness components (magnesium ions or calcium ions) having passed through the cation exchange membrane from the deionization chamber react under the alkaline conditions at the anion exchange membrane surface to generate calcium hydroxide or magnesium hydroxide. If carbonic ions are contained in concentrated water, calcium carbonate or magnesium carbonate is further generated. When scales are generated, the electrical resistance at the area on which scales are generated is increased and a current cannot flow easily therethrough. That is, a need arises to increase the voltage to obtain the same current values as those where there is no scale, resulting in an increase in power consumption. There is also a possibility of nonuniformity of current density in the concentration chamber. If the amount of scale is further increased, the differential pressure for passing water is increased and electrical resistance is further increased. In such a case, current flow, that is required for the removal of ions, fails, which results in the deterioration in the quality of treated water. In addition to this, there is also a possibility of grown scale penetrating to inner part of the ion exchange membrane, leading to damage to the ion exchange membrane.

As a method of preventing the generation of scale described above, filling the concentration chamber with an anion exchanger has been proposed. For example, Patent Literature 1 discloses a deionized water producing apparatus having an anion exchanger of a particular structure disposed on the anion exchange membrane side in a concentration chamber. In this deionized water producing apparatus, the diffusion of $OH^-$ into the concentrated water is promoted at the porous anion exchanger surface and rapidly reduces the $OH^-$ concentration at the surface. On the other hand, it becomes difficult for hardness component ions to permeate the porous anion exchanger. As a result, the chance of contact and reaction between OH⁻ and hardness component ions is reduced, and precipitation and accumulation of scale are prevented.

Patent Literature 2 discloses a deionized water producing apparatus in which two or more layers of ion exchangers differing in water permeability are provided in a concentration chamber, and the layer of the ion exchanger having lower water permeability is disposed on the anion exchange membrane side, anion exchange groups of which are provided at least in the surface of the layer. In this deionized water producing apparatus, when concentrated water containing a large amount of hardness components moving from a higher water permeability layer reaches the lower water permeability layer, the force of moving the concentrated water is reduced. As a result, the flow of concentrated water containing a large amount of hardness components into the concentration-chamber-side surface of the anion exchange membrane is blocked, thereby preventing precipitation and accumulation of scale.

CITATION LIST

Patent Literature

Patent Literature 1: JP 2001-225078 A
Patent Literature 2: JP 2002-1345 A

SUMMARY OF INVENTION

Technical Problem

In the deionized water producing apparatus, however, even if the generation of scale can be avoided by filling the concentration chamber with an anion exchanger, the problem described below, that is different from the problem of scale generation, arises. Weak-acid anion components typified by carbonic acid and silica contained in concentrated water pass through the ion exchange membrane interposed between the concentration chamber and the deionization chamber and diffuse in treated water to reduce the purity of the treated water. Such a reduction in the purity of treated water appears more noticeably in the case where the concentration chamber is filled with an anion exchanger. This problem will be described in detail with respect to a case with carbonic acid and silica by way of example.

A cation exchange membrane in general is an ion exchange membrane that selectively allows only cations to pass therethrough. The principle of this function is that the membrane itself has a minus charge and exerts repulsive force on anions bearing a minus charge and stops the anions from passing through the membrane. On the other hand, carbonic acid (carbon dioxide) and silica take on the form of various ion species in water solutions, which are in equilibrium.

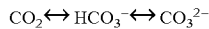

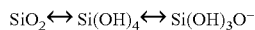

In states of equilibrium such as shown above, the proportion of each ion species in the whole varies largely depending on the pH. In a region where the pH is low, most of the carbonic acid and silica are not ionized, that is, they exist as $CO_2$ and $SiO_2$ with no electric charge.

Therefore, even when an attempt is made to stop transfer of carbonic acid and silica by using a cation exchange membrane in a low-pH region, these molecules easily pass through the cation exchange membrane since repulsive force based on minus charge does not act effectively.

This will be described specifically with reference to FIG. 8. Concentration chamber C2 is placed on the cathode side of deionization chamber D with a cation exchange membrane interposed therebetween. Concentration chamber C1 is placed on the anode side of deionization chamber D with an anion exchange membrane interposed therebetween. Deionization chamber D is filled with a cation exchanger and an anion exchanger, while concentration chambers C1 and C2 are filled with anion exchangers. Treated water is discharged out of the system through deionization chamber D.

A large amount of hydrogen ions (H⁺) generated by water-splitting reaction moves from deionization chamber D toward concentration chamber C2 by transfer through the cation exchanger together with cation components in water to be treated. Since concentration chamber C2 is filled with the anion exchanger, the hydrogen ions (H⁺) having passed through the cation exchange membrane are released all together at the concentration-chamber-side surface of the cation exchange membrane. That is, the state of the concentration-chamber-side surface of the cation exchange membrane becomes a hydrogen-ion (H⁺) rich state (i.e. low-pH state). On the other hand, carbonic acid and silica contained in concentrated water (although carbonic acid is shown in the figure, the same applies to silica) are captured as ions by the anion exchangers in concentration chambers C1 and C2 and move to the cation exchange membrane surfaces by transfer through the anion exchangers. At the cation exchange membrane surface in the concentration chamber C2, the concentrations of carbonic acid and silica are increased and the pH is reduced. As a result, since carbonic acid and silica are not ionized under a low-pH condition, they lose their charge after being liberated from the anion exchanger and pass through the cation exchange membrane to diffuse in the water to be treated.

Two deionization chambers (D1 and D2) are provided in a deionized water producing apparatus shown in FIG. 9. In a case where a plurality of deionization chambers are thus provided, not only carbonic acid and silica are originally contained in concentrated water, but also carbonic acid and silica contained in water to be treated move from the deionization chambers to the concentration chambers. Therefore, the concentrations of carbonic acid and silica in the concentration chambers are increased and the resulting reduction in purity of treated water due to mixing of carbonic acid and silica in the deionization chambers is noticeably larger (although carbonic acid is shown in the figure, the same applies to silica).

The present invention has been achieved in view of the above-described problem and an object of the present invention is to enable producing high-purity deionized water while preventing the generation of scale.

Solution to Problem

According to the present invention, there is provided an electrodeionization apparatus for producing deionized water comprising at least one deionization treatment unit provided between a cathode and an anode that are opposite each other, the deionization treatment unit including a deionization chamber and a pair of concentration chambers placed adjacent to the deionization chamber on opposite sides thereof and filled with anion exchangers. The deionization chamber is partitioned by an ion exchange membrane into a first small deionization chamber adjacent to one of the pair of concentration chambers and a second small deionization chamber adjacent to the other of the pair of concentration chambers. The first small deionization chamber is filled with an anion exchanger. The second small deionization chamber is filled with an anion exchanger and a cation exchanger in a sequence such that the ion exchanger, through which water that is to be treated finally passes, is the anion exchanger.

The deionization chamber is partitioned into two. However, the behavior of ions is basically the same as that in a case where the deionization chamber exists as one chamber with no partition.

In the above-described arrangement, when part of the anion components such as carbonic acid and silica that are present in the concentration chamber on the cathode side moves into the second small deionization chamber by passing through the ion exchange membrane, that part of the anion components is captured by the anion exchanger in the second small deionization chamber and moves to the concentration chamber on the anode side through the first small deionization chamber. Therefore, carbonic acid, silica, and other components that are present in the concentration chambers do not diffuse in the treated water.

Advantageous Effects of Invention

According to the present invention, an electrodeionization apparatus for producing deionized water capable of producing high-purity deionized water while preventing the generation of scale is realized.

DESCRIPTION OF EMBODIMENTS

Embodiment 1

An example of an embodiment of an electrodeionization apparatus for producing deionized water according to the present invention will be described with reference to the drawings.

Figure 1:
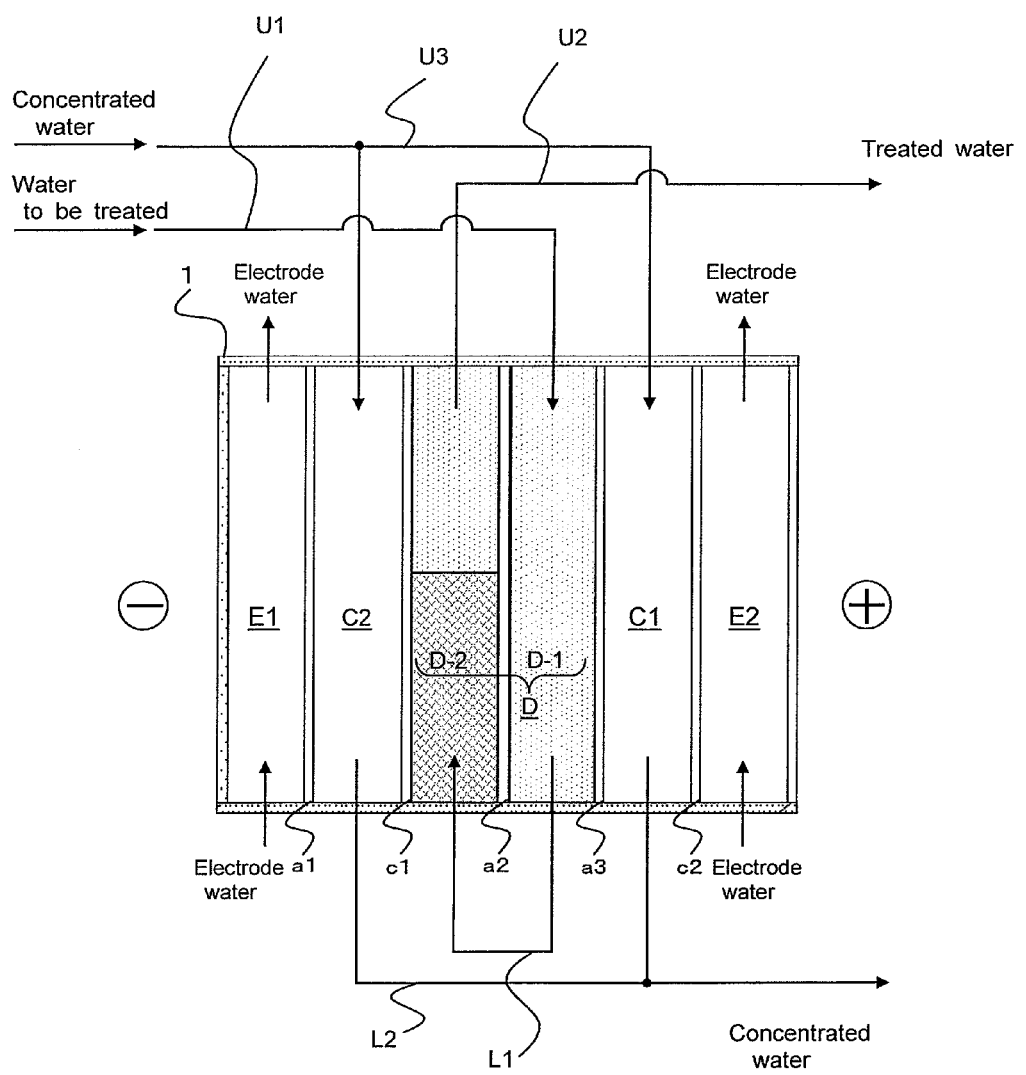
FIG. 1 is a schematic diagram showing an example of an embodiment of an electrodeionization apparatus for producing deionized water according to the present invention.

FIG. 1 is a diagram schematically showing the construction of a deionized water producing apparatus according to the present embodiment. In the deionized water producing apparatus shown in FIG. 1, a deionization treatment unit is provided between cathode chamber E1 that is provided with a cathode and anode chamber E2 that is provided as an anode. This deionization treatment unit consists of deionization chamber D and a pair of concentration chambers C1 and C2 placed adjacent to deionization chamber D on opposite sides thereof. In the following description, concentration chamber C1 adjacent to anode chamber E2 in the pair of concentration chambers C1 and C2 is referred to as "first concentration chamber C1", and concentration chamber C2 adjacent to cathode chamber E1 is referred to as "second concentration chamber C2", thus differentiating the pair of concentration chambers C1 and C2 from each other. However, this differentiation is made simply for ease of description.

In this embodiment, deionization chamber D is partitioned into two small deionization chambers. More specifically, deionization chamber D is partitioned into first small deionization chamber D-1 adjacent to first concentration chamber C1 and second small deionization chamber D-2 adjacent to second concentration chamber C2.

The above-described chambers are formed in frame member 1 by separating its interior space with a plurality of ion exchange membranes, and the chambers are adjacent to each other with the ion exchange membranes between them. The alignment of the chambers in the arrangement is as described below in order from cathode chamber E1. That is, cathode chamber E1 is adjacent to second concentration chamber C2, with first anion exchange membrane a1 interposed therebetween. Second concentration chamber C2 is adjacent to second small deionization chamber D-2, with first cation exchange membrane c1 interposed therebetween. Second small deionization chamber D-2 is adjacent to first small deionization chamber D-1, with second anion exchange membrane a2 interposed therebetween. First small deionization chamber D-1 is adjacent to first concentration chamber C1, with third anion exchange membrane a3 interposed therebetween. First concentration chamber C1 is adjacent to anode chamber E2, with second cation exchange membrane c2 interposed therebetween.

In the following description, the anion exchange membrane with which deionization chamber D is partitioned into first small deionization chamber D-1 and second deionization chamber D-2 is sometimes referred to as "intermediate ion exchange membrane" to be differentiated from the other ion exchange membranes. However, this differentiation is made simply for ease of description.

A cathode is housed in cathode chamber E1. The cathode is a metal mesh or plate form, e.g., a member made of stainless steel in mesh or plate form.

An anode is housed in anode chamber E2. The anode is a metal mesh or plate form. If water to be treated contains Cl$^-$, chlorine is generated at the anode. It is, therefore, desirable to use a material that is resistant to chlorine for the anode. An example of such a material for the anode is a metal such as platinum, palladium or iridium, or titanium coated with any of these metals.

Electrode water is supplied to each of cathode chamber E1 and anode chamber E2. The electrode water is electrolyzed in the vicinities of the electrodes to generate hydrogen ions or hydroxide ions. It is preferable to fill cathode chamber E1 and anode chamber E2 with ion exchangers in order to reduce the electrical resistance of the deionized water producing apparatus. Further, it is preferable to fill cathode chamber E1 with an anion exchanger such as a weakly basic anion exchanger or a strongly basic anion exchanger. Also, it is preferable to fill anode chamber E2 with a cation exchanger such as a weakly acidic cation exchanger or a strongly acidic cation exchanger.

First concentration chamber C1 and second concentration chamber C2 are provided to take in anion or cation components discharged from deionization chamber D and to eject them out of the system. Concentration chambers C1 and C2 are each filled with a single bed of an anion exchanger in order to prevent the generation of scale.

First small deionization chamber D-1 is filled with a single bed of an anion exchanger. Second small deionization chamber D-2 is filled with a multiple bed of an anion exchanger and a cation exchanger. Specifically, a cation exchange layer and an anion exchange layer are stacked along the direction of passage of water to be treated. More specifically, a cation exchange layer is disposed on the upstream side of the water passage direction, while an anion exchange layer is disposed on the downstream side of the water passage direction. That is, water to be treated, having flowed into second small deionization chamber D-2, passes through the cation exchange layer and the anion exchange layer in this order. In other words, the anion exchange layer and the cation exchange layer are stacked in a sequence such that the layer of the ion exchanger, through which water that is to be treated finally passes in the second small deionization chamber D-2, is the anion exchange layer.

In FIG. 1, frame member 1 having an integral structure is illustrated. In actuality, however, separate plural frame members are provided to the chambers and are disposed close to each other. The material of frame member 1 is not particularly specified if it has an insulating property and does not allow water to be treated to leak out. Examples of the material of frame member 1 can include resins such as polyethylene, polypropylene, polyvinyl chloride, ABS, polycarbonate and m-PPE (modified polyphenylene ether).

To facilitate understanding of the present invention, main flow paths of water to be treated and concentrated water in the deionized water producing apparatus shown in FIG. 1 will be outlined in advance. Water to be treated is supplied to first small deionization chamber D-1 and passes through small deionization chamber D-1. Water to be treated that has passed through first small deionization chamber D-1 is supplied to second small deionization chamber D-2 and is discharged out of the system after passing through small deionization chamber D-2. On the other hand, concentrated water is supplied in parallel to first concentration chamber C1 and second concentration chamber C2 and is discharged out of the system after passing through these concentration chambers.

Several flow channels U1 to U3, and L1 and L2 are provided through which water to be treated and concentrated water are caused to flow as described above. One end of flow channel U1 depicted above the deionized water producing apparatus in FIG. 1 is connected to the supply side for supplying water to be treated, and the other end of flow channel U1 is connected to first small deionization chamber D-1. One end of flow channel L1 depicted below the deionized water producing apparatus is connected to first small deionization chamber D-1, and the other end of flow channel L1 is connected to second small deionization chamber D-2. One end of flow channel U2 depicted above the deionized water producing apparatus is connected to second small deionization chamber D-2, and the other end of flow channel U2 is connected to the discharge side for discharging water to be treated.

One end of flow channel U3 depicted above the deionized water producing apparatus in FIG. 1 is connected to the supply side for supplying concentrated water. The other end of flow channel U3 is divided into two branches, which are respectively connected to first concentration chamber C1 and second concentration chamber C2. Flow channel L2 depicted below the deionized water producing apparatus has branches at one end respectively connected to first concentration chamber C1 and second concentration chamber C2. These branches merge into one flow channel at an intermediate point and the one flow channel is connected to the discharge side for discharging concentrated water.

Flow channels for supplying electrode water and flow channels for discharging supplied electrode water, not illustrated, are respectively connected to cathode chamber E1 and anode chamber E2.

The operation and functions of the deionized water producing apparatus having the above-described construction will now be described. Concentrated water is supplied to first concentration chamber C1 and second concentration chamber C2 from flow channel U3 and discharged through flow channel L2. Electrode water is supplied to cathode chamber E1 and anode chamber E2 from the flow channels not illustrated and the supplied electrode water is discharged through the flow channels not illustrated. A predetermined direct current voltage is applied between the anode and the cathode.

Under the above-described conditions, water to be treated is supplied from flow channel U1 to first small deionization chamber D-1. Anion components (e.g., $Cl^-$, $CO_3^{2-}$, $HCO_3^-$ and $SiO_2$) in the water supplied to be treated are captured in the course of passage of the water to be treated through first small deionization chamber D-1. The anion components captured in first small deionization chamber D-1 move into first concentration chamber C1, which is adjacent to first small deionization chamber D-1 with third anion exchange membrane a3 interposed therebetween, and are discharged out of the system together with the concentrated water flowing through first concentration chamber C1.

The water to be treated having passed through first small deionization chamber D-1 is supplied to second small deionization chamber D-2 through flow channel L1. In second small deionization chamber D-2, the cation exchange layer and the anion exchange layer are stacked in this order, as described above. Therefore, when the water to be treated is supplied to second small deionization chamber D-2, the water to be treated first passes through the cation exchange layer and then passes through the anion exchange layer. In the course of passage of the water to be treated through the cation exchange layer, cation components (e.g., $Na^+$, $Ca^{2+}$ and $Mg^{2+}$) in the water to be treated are captured. More specifically, the cation components captured by the cation exchanger in second small deionization chamber D-2 move into second concentration chamber C2, which is adjacent to second small deionization chamber D-2 with first cation exchange membrane c1 interposed therebetween, and are discharged out of the system together with concentrated water flowing through second concentration chamber C2.

Further, the water to be treated having passed through the cation exchange layer in second small deionization chamber D-2 passes through the downstream anion exchange layer. At this time, anion components (e.g., $Cl^-$, $CO_3^{2-}$, $HCO_3^-$ and $SiO_2$) in the water to be treated are again captured. More specifically, the anion components captured by the anion exchanger in second small deionization chamber D-2 move into first small deionization chamber D-1 adjacent to second small deionization chamber D-2 with intermediate ion exchange membrane a2 interposed therebetween. The anion components having moved into first small deionization chamber D-1 move into first concentration chamber C1, which is adjacent to first small deionization chamber D-1 with third anion exchange membrane a3 interposed therebetween, and are discharged out of the system together with the concentrated water flowing through first concentration chamber C1.

The flow process of deionization treatment in the deionized water producing apparatus according to the present embodiment is as described above. In the course of the above-described treatment, however, part of the anion components (carbonic acid and silica) contained in the concentrated water supplied to second concentration chamber C2 pass through first cation exchange membrane c1 to move into second small deionization chamber D-2. The principle of passage of carbonic acid and silica through the cation exchange membrane is as already described above. Carbonic acid and silica that move from second concentration chamber C2 into second small deionization chamber D-2 diffuse uniformly on the anode-side surface of first cation exchange membrane c1. That is, carbonic acid and silica diffuse not only on the region in second small deionization chamber D-2 in contact with the anion exchange layer but also on the region in contact with the cation exchange layer. Since carbonic acid and silica are not captured by the cation exchanger, carbonic acid and silica having diffused on the region in contact with the cation exchange layer in the anode-side surface of first cation exchange membrane c1 pass through the cation exchange layer together with the water to be treated. In second small deionization chamber D-2, however, the cation exchange layer and the anion exchange layer are stacked along the direction of passage of the water to be treated. Therefore, carbonic acid and silica having passed through the cation exchange layer are again ionized and captured in the downstream anion exchange layer, and move into first small deionization chamber D-1. Carbonic acid and silica having moved into first small deionization chamber D-1 pass through third anion exchange membrane a3 and move into first concentration chamber C1, and are discharged out of the system together with the concentrated water passing through first concentration chamber C1. As a result, carbonic acid and silica contained in the concentrated water do not diffuse in the water to be treated and thus do not cause a reduction in purity of the treated water.

It is apparent that if the cation exchange layer and the anion exchange layer in second small deionization chamber D-2 are stacked in the reverse order, carbonic acid and silica having diffused on the region in contact with the cation exchange layer in the anode-side surface of first cation exchange membrane c1 cannot be captured and the purity of the treated water is reduced.

From the above description, it is to be understood that the above-described effect can be obtained if the downstream-most layer in the stack of the ion exchangers provided in second small deionization chamber D-2 is the anion exchange layer. In other words, the above-described effect can be obtained if the ion exchanger, through which the water to be treated finally passes, when it passes through second small deionization chamber D-2, is the anion exchanger. Accordingly, the kinds, the stacking order and the number of ion exchange layers upstream of the downstream-most anion exchange layer are not restrictively specified. For example, four or more layers of the cation exchangers and the anion exchangers may be stacked in a sequence such that the downstream-most layer is the anion exchange layer.

In the deionized water producing apparatus according to the present embodiment, first small deionization chamber D-1 to which water to be treated is first supplied is filled with the anion exchanger, and the cation exchanger and the anion exchanger are stacked in this order in second small deionization chamber D-2 to which the water to be treated is next supplied. Accordingly, the water to be treated first passes through the anion exchanger. Anion components are thereby removed from the water to be treated and the pH of the water to be treated is increased.

Further, the water to be treated having passed through first small deionization chamber D-1 is supplied to second small deionization chamber D-2 in which the cation exchanger and the anion exchanger are stacked in this order. That is, the water to be treated having passed through the anion exchanger in first small deionization chamber D-1 then passes through the cation exchanger and again passes through the anion exchanger. In short, in the arrangement according to the present embodiment, the water to be treated passes through the alternate anion and cation exchangers.

The anion component capturing ability of the anion exchanger is increased when the pH of the water to be treated is low, while the cation component capturing ability of the cation exchanger is increased when the pH of the water to be treated is high. In the arrangement according to the present embodiment in which the water to be treated first passes through the anion exchanger and thereafter passes through the alternate cation and anion exchangers, therefore, the pH of the water to be treated passing through the cation exchanger after having passed through the anion exchanger is increased because of the removal of the anion components in the water to be treated. Therefore, reactions of the cation exchanger to remove cations are facilitated to a greater degree than is usually the case. Further, the pH of the water to be treated passing through the anion exchanger after having passed through the cation exchanger is reduced because of the removal of the cation components in the water to be treated. Therefore, reactions of the anion exchanger to remove anions are facilitated to a greater degree than is usually the case. Thus, not only a further improvement in the ability to remove anion components including carbonic acid and silica but also an improvement in the ability to remove cation components is achieved to further improve the purity of the treated water.

As described above, the deionized water producing apparatus according to the present embodiment has the effect of improving the purity of treated water by preventing part of the carbonic acid and silica contained in concentrated water from passing through the ion exchange membrane to diffuse in water to be treated. The deionized water producing apparatus also has improved ability to remove anion components including carbonic acid and silica contained in water to be treated and further has improved ability to remove cation components contained in water to be treated.

The present invention also includes an arrangement in which the concentration chamber also serves as an electrode chamber. For example, cathode chamber E1 may be omitted in a case where a cathode is provided in second concentration chamber C2 shown in FIG. 1. Also in such a case, the deionization treatment unit consists of the deionization chamber and the pair of concentration chambers is placed between the cathode and the anode.

Embodiment 2

Another example of the embodiment of the electrodeionization apparatus for producing deionized water according to the present invention will be described with reference to the drawings. The deionized water producing apparatus according to the present embodiment has the same construction as that according to Embodiment 1, except that a plurality of deionization treatment units are provided between the cathode chamber and the anode chamber. Thus, only the construction different from the deionized water producing apparatus according to Embodiment 1 will be described below. A description with respect to the common construction will not be made.

Figure 2:
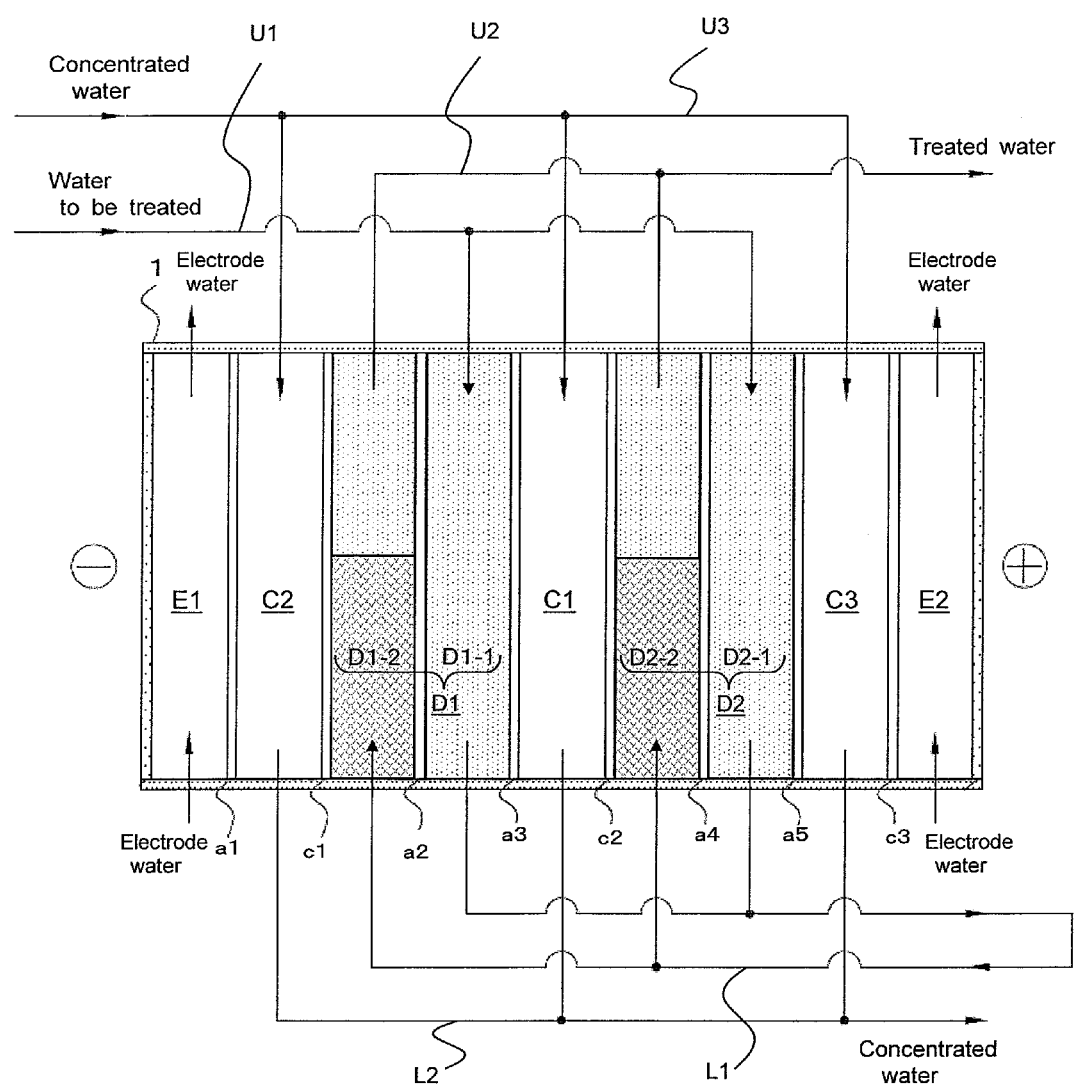
FIG. 2 is a schematic diagram showing another example of the embodiment of the electrodeionization apparatus for producing deionized water according to the present invention.

FIG. 2 is a diagram schematically showing the construction of the deionized water producing apparatus according to the present embodiment. In the deionized water producing apparatus shown in FIG. 2, two deionization treatment units are provided between cathode chamber E1 and anode chamber E2. The first deionization treatment unit in the two deionization sections, which is positioned on the cathode side relative to the other section, consists of deionization chamber D1 and a pair of concentration chambers C1 and C2 placed adjacent to deionization chamber D1 on opposite sides thereof. The second deionization treatment unit positioned on the anode side relative to the other section consists of deionization chamber D2 and a pair of concentration chambers C1 and C3 placed adjacent to deionization chamber D2 on opposite sides thereof.

In the following description, deionization chamber D1 constituting the first deionization treatment unit is referred to as "cathode-side deionization chamber D1" and deionization chamber D2 constituting the second deionization treatment unit is referred to as "anode-side deionization chamber D2", thus differentiating deionization chamber D1 and deionization chamber D2 from each other. Also, concentration chamber C1 is referred to as "first concentration chamber C1", concentration chamber C2 as "second concentration chamber C2", and concentration chamber C3 as "third concentration chamber C3", thus differentiating concentration chambers C1, C2, and C3 from each other. However, this differentiation is made simply for ease of description.

Further, cathode-side deionization chamber D1 and anode-side deionization chamber D2 are each partitioned into two small deionization chambers. In the following description, the small deionization chamber adjacent to first concentration chamber C1 in the two small deionization chambers constituting cathode-side deionization chamber D1 is referred to as "cathode-side first small deionization chamber D1-1", and the small deionization chamber adjacent to second concentration chamber C2 is referred to as "cathode-side second small deionization chamber D1-2". Also, the small deionization chamber adjacent to third concentration chamber C3 in the two small deionization chambers constituting anode-side deionization chamber D2 is referred to as "anode-side first small deionization chamber D2-1", and the small deionization chamber adjacent to first concentration chamber C1 is referred to as "anode-side second small deionization chamber D2-2". Needless to say, this differentiation is also made simply for ease of description.

The alignment of the chambers in the arrangement are as described below in order from cathode chamber E1. That is, cathode chamber E1 is adjacent to second concentration chamber C2, with first anion exchange membrane a1 interposed therebetween. Second concentration chamber C2 is adjacent to cathode-side second small deionization chamber D1-2, with first cation exchange membrane c1 interposed therebetween. Cathode-side second small deionization chamber D1-2 is adjacent to cathode-side first small deionization chamber D1-1, with second anion exchange membrane a2 interposed therebetween. Cathode-side first small deionization chamber D1-1 is adjacent to first concentration chamber C1, with third anion exchange membrane a3 interposed therebetween. First concentration chamber C1 is adjacent to anode-side second small deionization chamber D2-2, with second cation exchange membrane c2 interposed therebetween. Anode-side second small deionization chamber D2-2 is adjacent to anode-side first small deionization chamber D2-1, with fourth anion exchange membrane a4 interposed therebetween. Anode-side first small deionization chamber D2-1 is adjacent to third concentration chamber C3, with fifth anion exchange membrane a5 interposed therebetween. Third concentration chamber C3 is adjacent to anode chamber E2, with third cation exchange membrane c3 interposed therebetween.

First to third concentration chambers C1 to C3 are provided to take in anion or cation components discharged from cathode-side deionization chamber D1 or anode-side deionization chamber D2 and to eject them out of the system. Concentration chambers C1 to C3 are each filled with a single bed of an anion exchanger in order to prevent the generation of scale.

Cathode-side first small deionization chamber D1-1 and anode-side first small deionization chamber D2-1 are each filled with a single bed of an anion exchanger. Cathode-side second small deionization chamber D1-2 and anode-side second small deionization chamber D2-2 are each filled with a multiple bed of an anion exchanger and a cation exchanger. The detailed arrangement of the anion exchanger and the cation exchanger in cathode-side second small deionization chamber D1-2 and anode-side second small deionization chamber D2-2 is the same as that described in the description of Embodiment 1.

The main flow paths of water to be treated and concentrated water in the deionized water producing apparatus shown in FIG. 2 will be outlined. Water to be treated is supplied in parallel to cathode-side first small deionization chamber D1-1 and anode-side first small deionization chamber D2-1 and passes through these small deionization chambers. The flow paths of water to be treated that has passed through cathode-side first small deionization chamber D1-1 and anode-side first small deionization chamber D2-1 merge into one flow path outside these small deionization chambers, and then one flow path is again divided into two branches. Thereafter, water to be treated is supplied in parallel to cathode-side second small deionization chamber D1-2 and anode-side second small deionization chamber D2-2 and is discharged out of the system after passing through these small deionization chambers. On the other hand, concentrated water is supplied in parallel to first to third concentration chambers C1 to C3 and is discharged out of the system after passing through these concentration chambers.

Several flow channels U1 to U3, and L1 and L2 are provided through which water to be treated and concentrated water are caused to flow as described above. One end of flow channel U1 depicted above the deionized water producing apparatus in FIG. 2 is connected to the supply side for supplying water to be treated. The other end of flow channel U1 is divided into two branches which are respectively connected to cathode-side first small deionization chamber D1-1 and anode-side first small deionization chamber D2-1. Flow channel L1 shown below the deionized water producing apparatus has branches respectively connected to cathode-side first small deionization chamber D1-1 and anode-side first small deionization chamber D2-1. These branches merge into one flow channel at an intermediate point and then the one flow channel is again divided into two branches. These branches are respectively connected to cathode-side second small deionization chamber D1-2 and anode-side second small deionization chamber D2-2. Flow channel U2 shown above the deionized water producing apparatus has branches respectively connected to cathode-side second small deionization chamber D1-2 and anode-side second small deionization chamber D2-2. These branches merge into one at an intermediate point to be connected to the discharge side for discharging water to be treated.

One end of flow channel U3 depicted above the deionized water producing apparatus in FIG. 2 is connected to the supply side for supplying of concentrated water. The other side of flow channel U3 is divided into three branches which are respectively connected to first concentration chamber C1, second concentration chamber C2 and third concentration chamber C3. Flow channel L2 shown below the deionized water producing apparatus has branches respectively connected to first concentration chamber C1, second concentration chamber C2 and third concentration chamber C3. These branches merge into one at an intermediate point to be connected to the discharge side for discharging concentrated water.

The operation and functions of the deionized water producing apparatus having the above-described construction will now be described. Concentrated water is supplied to first to third concentration chambers C1 to C3 from flow channel U3 and discharged through flow channel L2. Electrode water is supplied to cathode chamber E1 and anode chamber E2 from the flow channels not illustrated and the supplied electrode water is discharged through the flow channels not illustrated. A predetermined direct current voltage is applied between the anode and the cathode.

Under the above-described conditions, flows of water to be treated from flow channel U1 is supplied in parallel to cathode-side first small deionization chamber D1-1 and anode-side first small deionization chamber D2-1. Anion components (e.g., $Cl^-$, $CO_3^{2-}$, $HCO_3^-$ and $SiO_2$) in the water supplied to be treated are captured in the course of passage of the water to be treated through first small deionization chambers D1-1 and D2-1. The anion components captured in cathode-side first small deionization chamber D1-1 move into first concentration chamber C1, which is adjacent to cathode-side first small deionization chamber D1-1 with third anion exchange membrane a3 interposed therebetween, and are discharged out of the system together with the concentrated water flowing through first concentration chamber C1. On the other hand, the anion components captured in anode-side first small deionization chamber D2-1 move into third concentration chamber C3, which is adjacent to anode-side first small deionization chamber D2-1 with fifth anion exchange membrane a5 interposed therebetween, and are discharged out of the system together with the concentrated water flowing through third concentration chamber C3.

The water to be treated having passed through cathode-side first small deionization chamber D1-1 and anode-side first small deionization chamber D2-1 is supplied to cathode-side second small deionization chamber D1-2 and anode-side second small deionization chamber D2-2 through flow channel L1. In cathode-side second small deionization chamber D1-2 and anode-side second small deionization chamber D2-2, the cation exchange layer and the anion exchange layer are stacked in this order, as described above. Therefore, when the water to be treated is supplied to cathode-side second small deionization chamber D1-2 and anode-side second small deionization chamber D2-2, the water to be treated first passes through the cation exchange layer and then passes through the anion exchange layer. In the course of passage of the water to be treated through the cation exchange layer, cation components (e.g., $Na^+$ $Ca^{2+}$ and $Mg^{2+}$) in the water to be treated are captured. More specifically, the cation components captured by the cation exchanger in cathode-side second small deionization chamber D1-2 move into second concentration chamber C2, which is adjacent to cathode-side second small deionization chamber D1-2 with first cation exchange membrane c1 interposed therebetween, and are discharged out of the system together with the concentrated water flowing through second concentration chamber C2. On the other hand, the cation components captured by the cation exchanger in anode-side second small deionization chamber D2-2 move into first concentration chamber C1, which is adjacent to anode-side second small deionization chamber D2-2 with 1.0 second cation exchange membrane c2 interposed therebetween, and are discharged out of the system together with the concentrated water flowing through first concentration chamber C1.

Further, anion components (e.g., $Cl^-$, $CO_3^{2-}$, $HCO_3^-$ and $SiO_2$) in the water to be treated having passed through the cation exchange layer in cathode-side second deionization chamber D1-2 and anode-side second deionization chamber D2-2 are again captured in the course of passage of the water to be treated through the downstream anion exchange layer. More specifically, the anion components captured by the anion exchanger in cathode-side second small deionization chamber D1-2 move into cathode-side first small deionization chamber D1-1 adjacent to cathode-side second small deionization chamber D1-2 with intermediate ion exchange membrane a2 interposed therebetween. The anion components having moved into cathode-side first small deionization chamber D1-1 move into first concentration chamber C1, which is adjacent to cathode-side first small deionization chamber D1-1 with third anion exchange membrane a3 interposed therebetween, and are discharged out of the system together with the concentrated water flowing through first concentration chamber C1. On the other hand, the anion components captured by the anion exchanger in anode-side second small deionization chamber D2-2 move into anode-side first small deionization chamber D2-1 adjacent to anode-side second small deionization chamber D2-2 with intermediate ion exchange membrane a4 interposed therebetween. The anion components having moved into anode-side first small deionization chamber D2-1 move into third concentration chamber C3, which is adjacent to anode-side first small deionization chamber D2-1 with fifth anion exchange membrane a5 interposed therebetween, and are discharged out of the system together with the concentrated water flowing through third concentration chamber C3.

The flow process of deionization treatment in the deionized water producing apparatus according to the present embodiment is as described above. In a case where a plurality of deionization chambers are provided, as in the deionized water producing apparatus according to the present embodiment, however, the concentrations of carbonic acid and silica in a particular concentration chamber are increased compared to those in any of the other concentration chambers. In the deionized water producing apparatus according to the present embodiment, for example, in addition to carbonic acid and silica originally contained in the concentrated water that is supplied to first concentration chamber C1, carbonic acid and silica from cathode-side deionization chamber D1 move into first concentration chamber C1 adjacent to deionization chamber D1 shown in FIG. 2. Also, in addition to carbonic acid and silica originally contained in the concentrated water that is supplied to third concentration chamber C3, carbonic acid and silica from cathode-side deionization chamber D2 move into third concentration chamber C3 adjacent to deionization chamber D2 shown in FIG. 2. The principle of transferring carbonic acid and silica from the adjacent deionization chamber into the concentration chamber is the same as that described in the description of Embodiment 1. As a result, the concentrations of carbonic acid and silica are increased in first concentration chamber C1 and third concentration chamber C3 compared to those in concentration chamber C2, and the amounts of carbonic acid and silica passing through the adjacent cationic exchange membranes are also increased. In particular, concentration chamber C1 is adjacent to anode-side deionization chamber D2 and the above-described transfer of carbonic acid and silica to anode-side deionization chamber D2 (diffusion of carbonic acid and silica into the water to be treated) is a concern.

In the arrangement according to the present embodiment, however, carbonic acid and silica having moved from first concentration chamber C1 into anode-side second small deionization chamber D2-2 are captured by the anion exchanger filling deionization chamber D2-2 and move into third concentration chamber C3 through anode-side first small deionization chamber D2-1 to be discharged out of the system. Therefore, carbonic acid and silica moving from first concentration chamber C1 into anode-side second small deionization chamber D2-2 do not diffuse in the water to be treated.

Also in the present embodiment, each of cathode-side first small deionization chamber D1-1 and anode-side first small deionization chamber D2-1 to which the water to be treated is first supplied is filled with an anion exchanger. In addition, a cation exchanger and an anion exchanger are stacked in this order in each of cathode-side second small deionization chamber D1-2 and anode-side second small deionization chamber D2-2 to which the water to be treated having passed through cathode-side first small deionization chamber D1-1 and anode-side first small deionization chamber D2-1 is supplied. That is, the water to be treated first passes through the anion exchanger, then passes through the cation exchanger and, thereafter, again passes through the anion exchanger. Thus, the purity of water to be treated is further improved according to the same principle described above in the description of Embodiment 1.

Anode chamber E2 may be omitted in a case where an anode is provided in third concentration chamber C3 shown in FIG. 2. Cathode chamber E1 may be omitted in a case where a cathode is provided in second concentration chamber C2.

(Comparison Test 1)

A comparison test described below was conducted to confirm the effects of the present invention. That is, four deionized water producing apparatuses that differ from each other only with respect to the arrangement of ion exchangers in second small deionization chamber D-2 shown in FIG. 1 were prepared. FIGS. 3(a) to 3(d) show the arrangements of ion exchangers in second small deionization chamber D-2 in the deionized water producing apparatuses.

Figure 3:
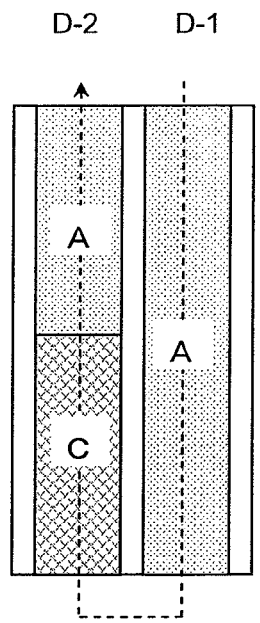
FIGS. 3(a) to 3(d) are schematic diagrams showing the constructions of ion exchangers in the second small deionization chambers in Examples 1 and 2 and Comparative Examples 1 and 2.
Figure 3:
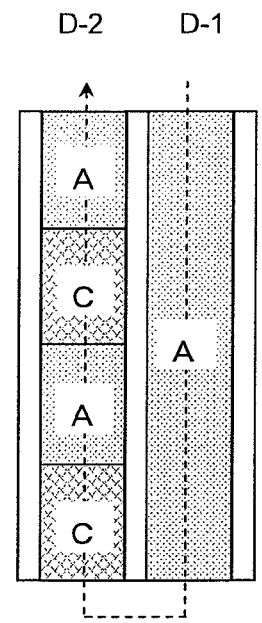
Figure 3:
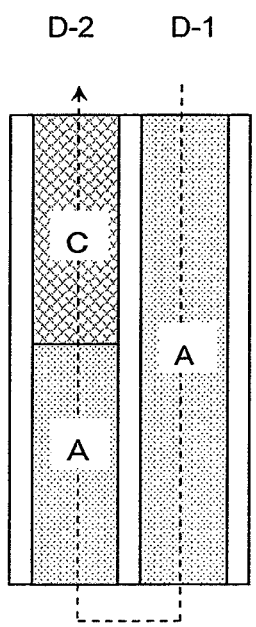
Figure 3:
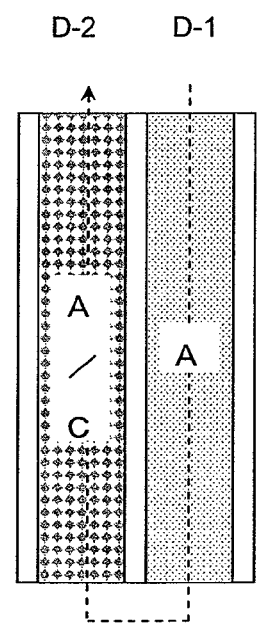

As shown in FIG. 3(a), in second small deionization chamber D-2 in the deionized water producing apparatus (Example 1), upstream cation exchange layer (C) and downstream anion exchange layer (A) are stacked along the direction of passage of water to be treated. That is, in Example 1, the same deionization chamber as that shown in Embodiment 1 described above is provided.

As shown in FIG. 3(b), in second small deionization chamber D-2 in the deionized water producing apparatus (Example 2), cation exchange layer (C) and anion exchange layer (A) are alternately stacked in order of cation/anion/cation/anion (a total of four layers) along the direction of passage of water to be treated. That is, in Example 2, essentially the same deionization chamber as that shown in Embodiment 1 described above is provided.

As shown in FIG. 3(c), in second small deionization chamber D-2 in the deionized water producing apparatus (Comparative Example 1), upstream anion exchanger layer (A) and downstream cation exchanger layer (C) are stacked along the direction of passage of water to be treated.

As shown in FIG. 3(d), second small deionization chamber D-2 in the deionized water producing apparatus (Comparative Example 2) is filled with a mixture of a cation exchanger and an anion exchanger (mixing ratio 1:1). That is, second small deionization chamber D-2 is filled with a mixed-bed of a cation exchanger and an anion exchanger. In each of the examples of the present invention and the comparative examples, each chamber is filled with a single bed form of the anion exchanger or the cation exchanger unless otherwise specified. In FIGS. 3(a) to 3(d), the dashed-line arrow indicates the direction of passage of water to be treated.

Conditions of this comparison test, including specifications, the rates of passage of water and the type of supplied water, common to the examples of the present invention and the comparative examples are as shown below. CER is an abbreviation of the cation exchanger (Cation Exchange Resin) and AER is an abbreviation of the anion exchanger (Anion Exchange Resin).

Cathode chamber: 100×300×4 mm in size, filled with AER
Anode chamber: 100×300×4 mm in size, filled with CER
First small deionization chamber: 100×300×8 mm in size, filled with AER
Concentration chamber: 100×300×4 mm in size, filled with AER
Deionization chamber flow rate: 20 L/h
Concentration chamber flow rate: 2 L/h
Electrode chamber flow rate: 10 L/h
Water supplied to deionization chamber and concentration chamber: one-stage RO permeate water with 10±1 µS/cm
Water supplied to electrode chamber: water treated in the deionization chamber
Applied current value: 0.4 A
Silica concentration: 1000 ppb Each of the deionized water producing apparatuses in Examples 1 and 2 and Comparative Examples 1 and 2 was continuously operated for 200 hours under the conditions shown above, and the operating voltage, the electrical resistivity of the treated water and the concentration of silica in the treated water were thereafter measured. The theoretical resistivity of water containing no impurity is 18.2 MΩ·cm at 25° C. The quality of the deionized water can be evaluated by assuming that the closer the resistivity value is to 18.2 MΩ·cm, the higher is the quality of the water. Further, the quality of the water can be evaluated by assuming that higher the resistivity value is above 18.2 MΩ·cm, the significantly higher is the quality of the water. Table 1 shows the results of measurements.

TABLE 1

|  | Example 1 | Example 2 | Comparative Example 1 | Comparative Example 2 |
|---|---|---|---|---|
| Operating voltage [V] | 16.2 | 16.6 | 15.9 | 15.7 |
| Electrical resistivity of treated water [MΩ · cm] | 17.9 | 18.1 | 9.87 | 10.2 |
| Concentration of silica in treated water [ppb] | 0.6 | 0.3 | 2.4 | 2.2 |

As shown in Table 1, substantially no difference in operating voltage was observed between the examples of the present invention and the comparative examples. In Examples 1 and 2, however, extremely clean treated water having an electrical resistivity close to 18 MΩ·cm was obtained. On the other hand, the electrical resistivity of the treated water obtained in Comparative Examples 1 and 2 was 10 to 12 MΩ·cm. When a component analysis of the treated water was performed, it was found that the main impurity in the treated water was carbonic acid. The concentrations of silica in the treated water obtained in Examples 1 and 2 were very low, 0.6 and 0.3 ppb. In contrast, the concentrations of silica in the treated water obtained in Comparative Examples 1 and 2 were high, 1 to 2 ppb. From these results, it was confirmed that high-purity deionized water can be produced by providing a single bed form of an anion exchanger as the final treatment layer in the deionization chamber so that anion components diffused from the concentration chamber to the deionization chamber can be captured.

Further, from the comparison between Example 1 and Example 2, it can be understood that deionized water of a higher purity can be produced in Example 2. While the constructions of first small deionization chambers D-1 in Examples 1 and 2 are identical to each other, the constructions of second small deionization chambers D-2 in Examples 1 and 2 are different from each other. More specifically, while one cation exchange layer (C) and one anion exchange layer (A) are stacked in second small deionization chamber D-2 in Example 1, two cation exchange layers (C) and two anion exchange layers (A) are alternately stacked in second small deionization chamber D-2 in Example 2.

Therefore, the water to be treated having passed through first small deionization chamber D-1 in Example 1 (passed through the anion exchanger) thereafter passes through the alternate cation and anion exchangers one time. In the entire deionization chamber, the water to be treated passes through the anion exchanger two times and passes through the cation exchanger one time.

On the other hand, the water to be treated having passed through first small deionization chamber D-1 in Example 2 (passed through the anion exchanger) thereafter successively passes through each of the cation and anion exchangers two times. In the entire deionization chamber, the water to be treated passes through the anion exchanger three times and passes through the cation exchanger two times.

Thus, in Embodiment 2, ion exchange reactions repeating a larger number of times than usual have improved efficiency, resulting in further improving the purity of the treated water. From the above-described results, it can be understood that deionized water with higher purity can be produced if the number of times that the anion exchanger layer and the cation exchanger layer are repeatedly provided in second small deionization chamber D-2 is increased.

Embodiment 3

Still another example of the embodiment of the deionized water producing apparatus according to the present invention will be described with reference to FIG. 4. The deionized water producing apparatus according to the present embodiment has the same basic construction as that according to Embodiment 2. Thus, only differences from the deionized water producing apparatus according to Embodiment 2 will be described below. A description with respect to the common points will not be made.

Figure 4:
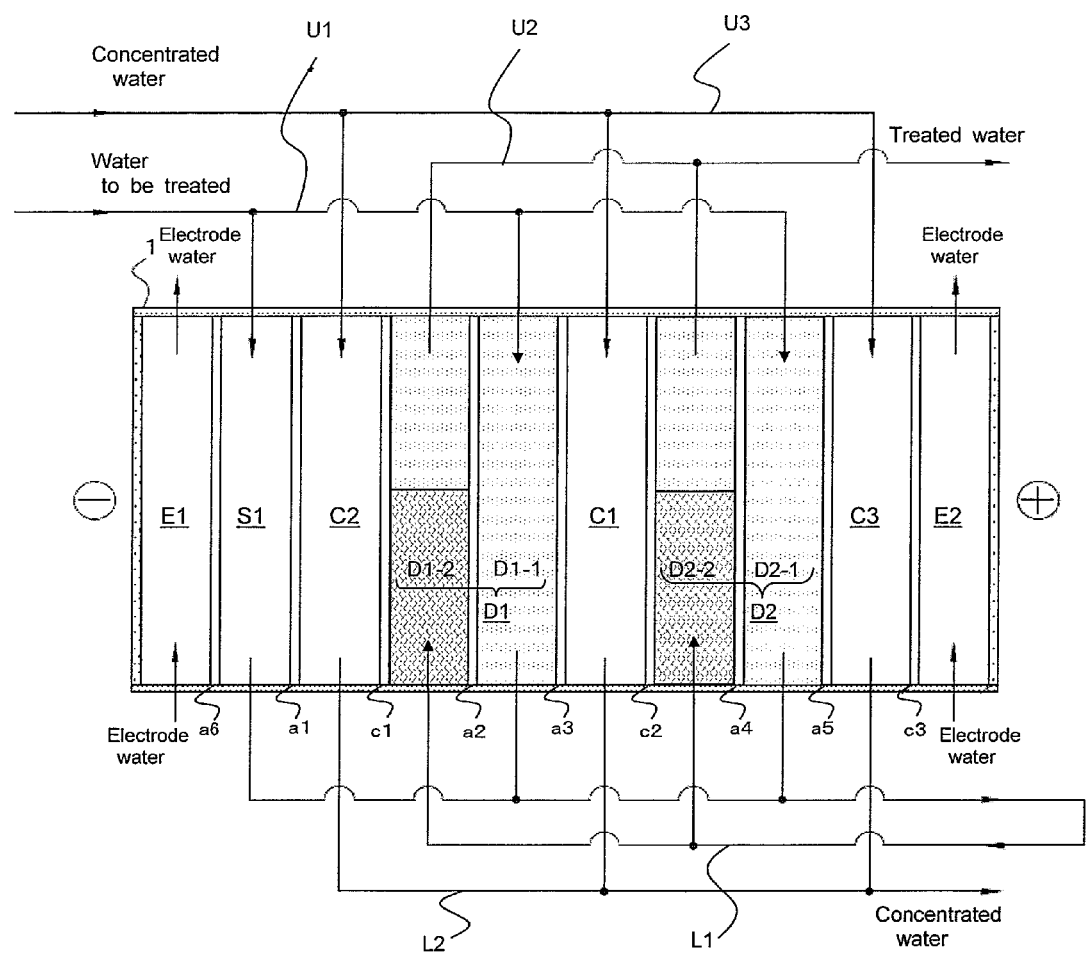
FIG. 4 is a schematic diagram showing still another example of the embodiment of the electrodeionization apparatus for producing deionized water according to the present invention.

As shown in FIG. 4, sub-deionization chamber S1 is provided between cathode chamber E1 and second concentration chamber C2 in the deionized water producing apparatus according to the present embodiment. Sub-deionization chamber S1 is adjacent to cathode chamber E1 with sixth anion exchange membrane a6 interposed therebetween. Sub-deionization chamber S1 is adjacent to second concentration chamber C2 with first anion exchange membrane c1 interposed therebetween. Sub-deionization chamber S1 is filled with a single bed of an anion exchanger.

In the deionized water producing apparatus according to the present embodiment, water to be treated from flow channel U1 is supplied in parallel to cathode-side first small deionization chamber D1-1, anode-side first small deionization chamber D2-1 and sub-deionization chamber S1. Anion components (e.g., $Cl^-$, $CO_3^{2-}$, $HCO_3^-$ and $SiO_2$) in the water to be treated supplied to sub-deionization chamber S1 are captured in the course of passage of the water to be treated through sub-deionization chamber S1. The captured anion components move into second concentration chamber C2, which is adjacent to sub-deionization chamber S1 with first anion exchange membrane a1 interposed therebetween, and are discharged out of the system together with the concentrated water flowing through second concentration chamber C2. On the other hand, the water to be treated having passed through sub-deionization chamber S1 merges with the water to be treated having passed through the cathode-side first small deionization chamber D1-1 and anode-side first small deionization chamber D2-1. The water to be treated is thereafter supplied to cathode-side second small deionization chamber D1-2 or anode-side second small deionization chamber D2-2. The subsequent flow paths of the water to be treated and transfer of ions are the same as those described above in the description of Embodiment 1 or Embodiment 2, and thus a description for them will not be repeated.

In the deionized water producing apparatus, hardness components such as magnesium ions and calcium ions contained in the water to be treated move from the deionization chambers to the concentration chambers. These hardness components react with ions such as $CO_3^{2-}$ and $OH^-$ at the surfaces of the ion exchange membranes to form calcium carbonate and magnesium hydroxide, for example, and precipitate as scale. Precipitation of such scale tends to occur in a high-pH region, and is often observed on regions where the pH is locally high, such as the cathode surface in the cathode chamber and the anion exchange membrane surfaces, in the deionized water producing apparatus. Reducing the pH at scale generation points is effective as a solution to this problem. The pH can be reduced if anion components such as carbonic acid can be provided. In other words, if anion components can be supplied from each deionization chamber to the adjacent concentration chamber, the generation of scale can be prevented.

Referring to FIG. 2, in the deionized water producing apparatus according to Embodiment 2, anion components supplied to first concentration chamber C1 mainly come from cathode-side deionization chamber D1, and anion components supplied to third concentration chamber C3 mainly come from anode-side deionization chamber D2. Therefore, the generation of scale on the membrane surfaces of third anion exchange membrane a3 and fifth anion exchange membrane a5 is prevented. However, the amount of anion components supplied to second concentration chamber C2 positioned closest to the cathode chamber is smaller than the amounts of anion components supplied to first concentration chamber C1 and third concentration chamber C3. That is, the membrane surface of first anion exchange membrane a1 is under such a condition that scale can be easily generated compared to the membrane surfaces of third anion exchange membrane a3 and fifth anion exchange membrane a5.

On the other hand, in the deionized water producing apparatus according to the present embodiment in which sub-deionization chamber S1 filled with an anion exchanger is provided between cathode chamber E1 and second concentration chamber C2, anion components are supplied from sub-deionization chamber S1 to second concentration chamber C2. Therefore, a local increase in pH on the membrane surface of first anion exchange membrane a1 can be prevented and the generation of scale is also prevented.

Further, the anion exchanger filling sub-deionization chamber S1 is regenerated by OH⁻ generated in cathode chamber E1. Thus, in the deionized water producing apparatus according to the present embodiment, OH⁻ that is generated in cathode chamber E1 and discarded without being utilized in the conventional apparatus is effectively used to regenerate the ion exchanger.

Moreover, the efficiency of generation of OH⁻ in cathode chamber E1 is high. Therefore, even if an electric potential is low, a sufficient amount of OH⁻ moves into sub-deionization chamber S1. Therefore, the voltage applied between the electrodes can be lowered and the cost of operation of the deionized water producing apparatus can be reduced. Further, while sub-deionization chamber S1 is added as a new deionization chamber in the present embodiment, there is no need to newly add a concentration chamber with the addition of sub-deionization chamber S1. That is, the number of concentration chambers can be relatively reduced. This means not only reducing the size and cost of the apparatus but also lowering the applied voltage and the operation cost.

While the present embodiment has been described by way of example with respect to a case where two deionization treatment units are provided between the cathode chamber and the anode chamber, one deionization treatment unit or three or more deionization treatment units may be alternatively provided. For example, a sub-deionization chamber of the above-described construction may be provided between cathode chamber E1 and second concentration chamber C2 shown in FIG. 1.

Anode chamber E2 may be omitted in a case where an anode is provided in concentration chamber C3 in FIG. 4.

(Comparison Test 2)

Each of the deionized water producing apparatuses according to the present embodiment and Embodiment 2 was continuously operated for 1000 hours and the quality of treated water was measured at intervals of 100 hours. After the end of the operation, each of the apparatuses was disassembled and the existence/absence of scale was visually observed.

Conditions of this comparison test, including specifications, the rates of passage of water and the type of supplied water, are as shown below. CER is an abbreviation of the cation exchanger (Cation Exchange Resin) and AER is an abbreviation of the anion exchanger (Anion Exchange Resin).

Figure 5:
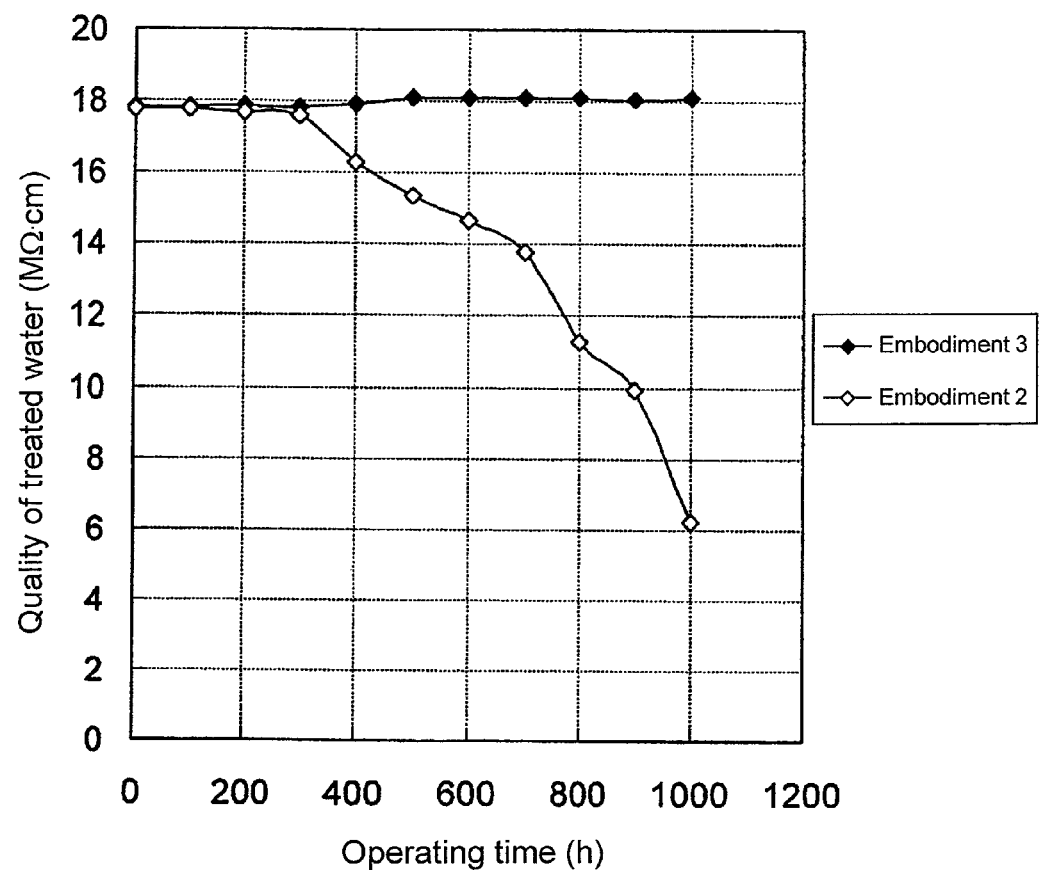
FIG. 5 is a diagram showing the results of comparison test 2.

Cathode chamber: 100×300×4 mm in size, filled with AER
Anode chamber: 100×300×4 mm in size, filled with CER
Cathode-side first small deionization chamber and anode-side first small deionization chamber: 100×300×8 mm in size, filled with AER
Cathode-side second small deionization chamber and anode-side second small deionization chamber: 100×300×8 mm in size, filled with AER/CER (stacked)
Sub-deionization chamber: 100×300×8 mm in size, filled with AER
Concentration chamber: 100×300×4 mm in size, filled with AER
Deionization chamber flow rate: 20 L/h
Concentration chamber flow rate: 2 L/h
Electrode chamber flow rate: 10 l/h
Water supplied to deionization chamber and concentration chamber: one-stage RO permeate water with 10±1 μS/cm
Water supplied to electrode chamber: water treated in the deionization chamber
Applied current value: 0.4 A By this comparison test, results such as shown in the graph of FIG. 5 were obtained. It was confirmed by visual observation that after operation for 1000 hours, scales were generated in the concentration chamber positioned closest to the cathode chamber in the apparatus in Embodiment 2. In the apparatus according to the present embodiment, no scale was observed in all the concentration chambers. From these results, it was made clear that, as a result of the provision of the sub-deionization chamber adjacent to the cathode chamber, the generation of scale in the concentration chamber closest to the cathode chamber was prevented and high-purity deionized water was stably obtained.

Embodiment 4

A further example of the embodiment of the deionized water producing apparatus according to the present invention will be described. The deionized water producing apparatus according to the present embodiment and that according to Embodiment 1 differ from each other only in that a bipolar membrane is disposed in second small deionization chamber D-2 shown in FIG. 1, but otherwise have the same construction. Thus, only the above-described difference will be described below, and a description with respect to the common points will not be made. The bipolar membrane is an ion exchange membrane integrally formed by adhering an anion exchange membrane and a cation exchange membrane to each other. The bipolar membrane has a feature that water-splitting reaction is strongly promoted at the joint surface between the anion exchange membrane and the cation exchange membrane.

Figure 6:
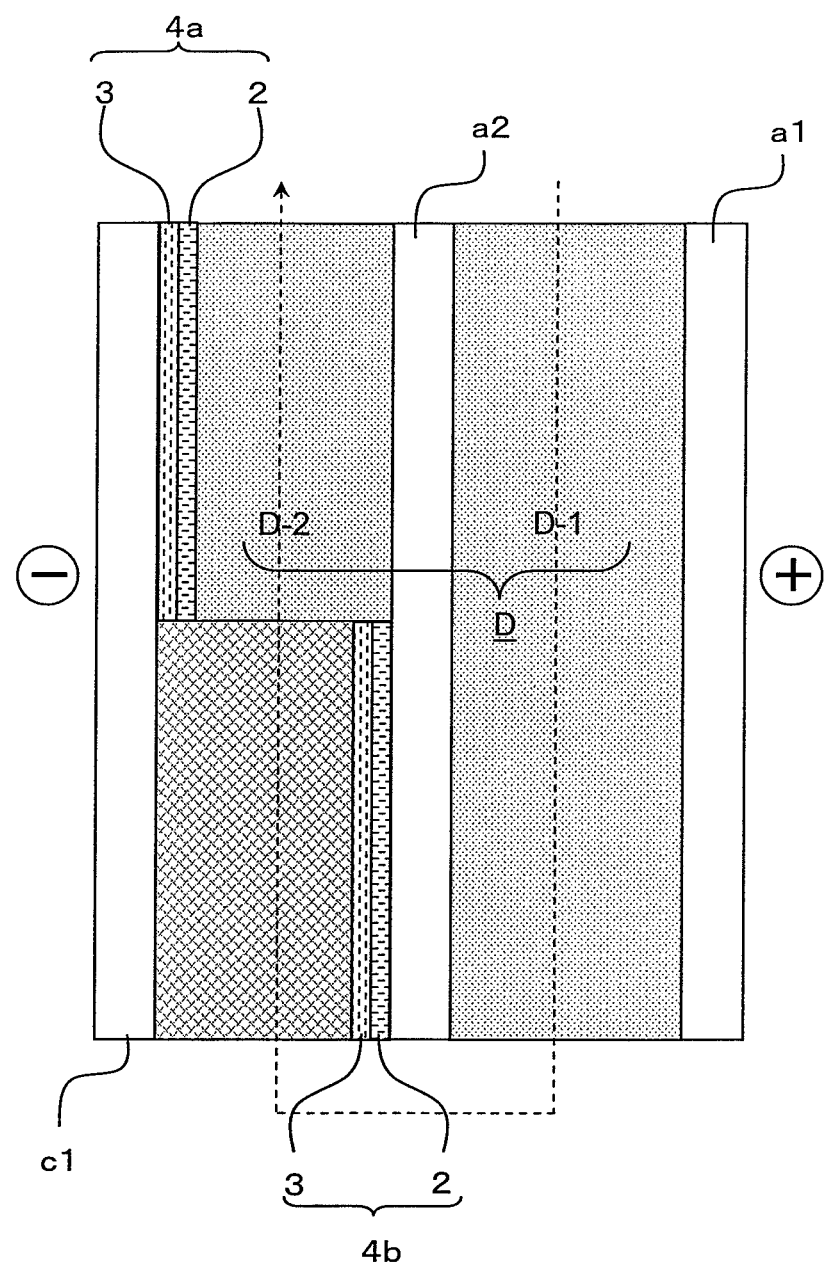
FIG. 6 is a schematic diagram showing a further example of the embodiment of the electrodeionization apparatus for producing deionized water according to the present invention.

FIG. 6 is a schematic sectional view showing deionization chamber D provided in the deionized water producing apparatus according to the present embodiment. As shown in FIG. 6, first bipolar membrane 4a and second bipolar membrane 4b are respectively disposed in second small deionization chamber D-2. More specifically, first bipolar membrane 4a is disposed on the cathode side of the anion exchanger (anion exchange layer) that fills second small deionization chamber D-2, while second bipolar membrane 4b is disposed on the anode side of the cation exchanger (cation exchange layer). Further, first bipolar membrane 4a is disposed so that its anion exchange membrane 2 faces the anion exchanger (anion exchange layer), and second bipolar membrane 4b is disposed so that its cation exchange membrane 3 faces the cation exchanger (cation exchange layer). In other words, in second small deionization chamber D-2, first bipolar membrane 4a is disposed between the anion exchanger and first cation exchange membrane c1 so that its anion exchange membrane 2 faces the anion exchanger. Also, second bipolar membrane 4b is disposed between the cation exchanger and second anion exchange membrane (intermediate ion exchange membrane) a2 so that its cation exchange membrane 3 faces the cation exchanger.

In the deionized water producing apparatus, water split by electricity functions as a regenerant for the ion exchangers, as already described. Water-splitting reaction, however, is promoted at the interfaces between the ion exchangers and the ion exchange membranes. Therefore, water-splitting reaction is strongly affected by the combinations of the ion exchangers and the ion exchange membranes. For this reason, in a case where ion exchangers with different signs (an anion exchanger and a cation exchanger) are stacked as in second small deionization chamber D-2 shown in FIG. 1, the overvoltages necessary for water splitting are changed between the layers. Therefore, it is possible that an uneven flow of electric current may occur resulting in failure to obtain the desired current distribution.

In the deionized water producing apparatus according to the present embodiment, therefore, first bipolar membrane 4a is disposed on the cathode side of the anion exchanger (anion exchange layer) that fills part of second small deionization chamber D-2, as described above. The anion exchanger then contacts not first cation exchange membrane c1 but the anion exchange membrane in first bipolar membrane 4a, thereby eliminating the above-described uneven current flow. From the viewpoint of the previously-described influence of the combination of the ion exchanger and the ion exchange membrane on water-splitting reaction, the bipolar membrane may be disposed on only the cathode side of the anion exchanger (anion exchanger layer) that fills second small deionization chamber D-2. That is, only first bipolar membrane 4a shown in FIG. 6 may be disposed, while second bipolar membrane 4b may be omitted. In such a case, however, there is a possibility that the balance between the anion exchange layer and the cation exchange layer will be lost. In the present embodiment, therefore, the bipolar membranes are disposed on both the cathode side of the anion exchanger (anion exchange layer) and the anode side of the cation exchanger (cation exchange layer) respectively to further improve the reliability of a stable operation at a high current density.

While the present embodiment has been described by way of example with respect to a case where one deionization treatment unit is provided between the cathode chamber and the anode chamber, two or more deionization treatment units may be provided. For example, the above-described first and second bipolar membranes may be disposed respectively in cathode-side second small deionization chamber D1-2 and anode-side second small deionization chamber D2-2 shown in FIG. 2.

(Comparison Test 3)

A comparison test described below was conducted to confirm the effects of the present invention. That is, four deionized water producing apparatuses that differ from each other with respect to the existence/absence or location of bipolar membranes in second small deionization chamber D-2 shown in FIG. 1 were prepared.

Figure 7:
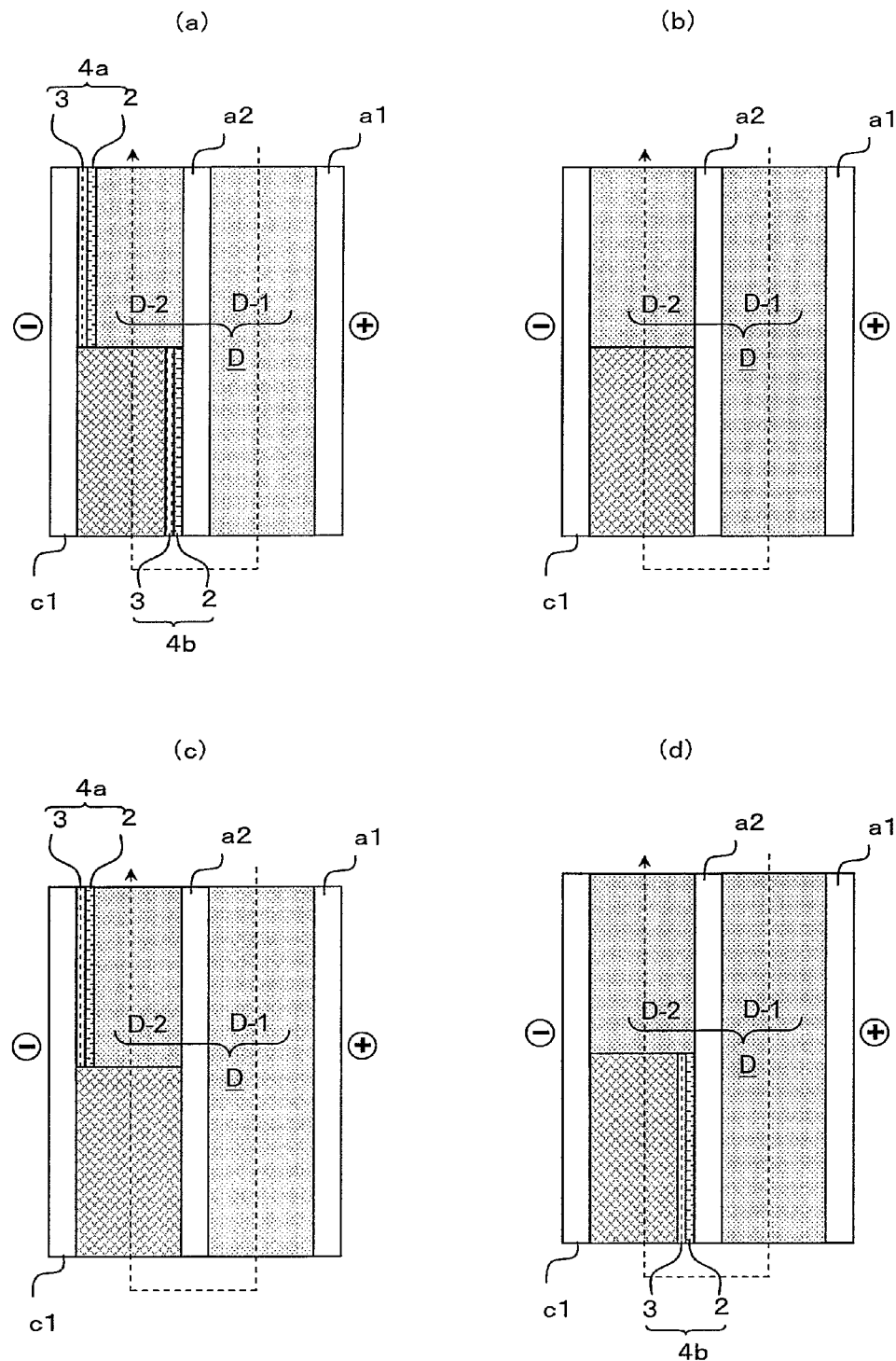
FIGS. 7(a) to 7(d) are schematic diagrams showing the presence/absence of bipolar membranes and the arrangement of bipolar membranes in the second small deionization chambers in Example 3 and Comparative Examples 3 to 5.
Figure 8:
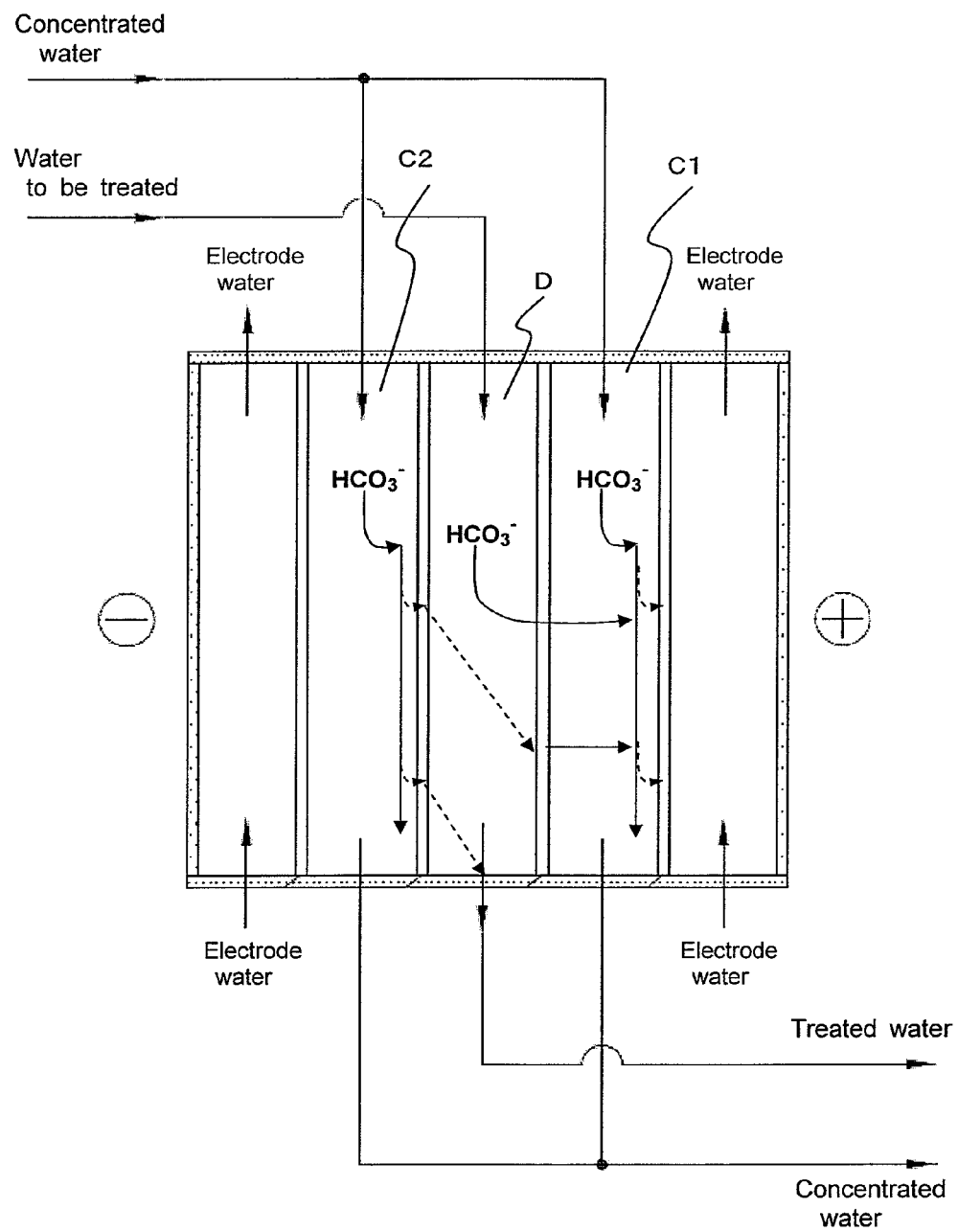
FIG. 8 is a diagram showing the principle of diffusion of a carbonic acid component from concentrated water into water to be treated.
Figure 9:
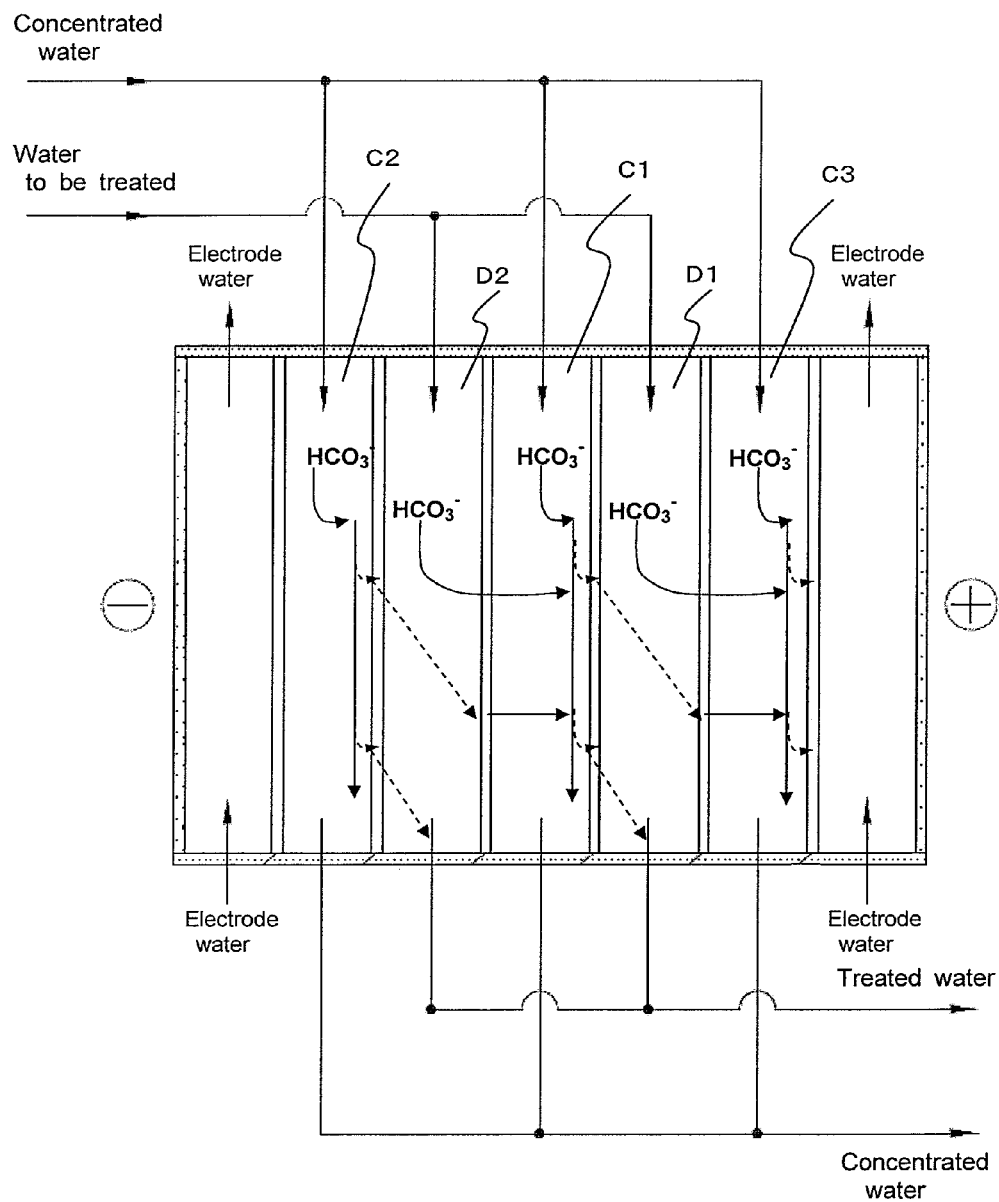
FIG. 9 is a schematic diagram showing the principle of rediffusion of a carbonic acid component from treated water into water to be treated.

As shown in FIG. 7(a), in the second small deionization chamber in the deionized water producing apparatus (Example 3), first bipolar membrane 4a and second bipolar membrane 4b are respectively disposed. Further, first bipolar membrane 4a is disposed so that its anion exchange membrane 2 faces the anion exchanger (anion exchange layer), while second bipolar membrane 4b is disposed so that its cation exchange membrane 3 faces the cation exchanger (cation exchange layer). That is, this deionized water producing apparatus has the same deionization chamber as that of the deionized water producing apparatus according to the present embodiment.

As shown in FIG. 7(b), in the second small deionization chamber in the deionized water producing apparatus (Comparative Example 3), no bipolar membrane is disposed.

As shown in FIG. 7(c), in the second small deionization chamber in the deionized water producing apparatus (Comparative Example 4), only first bipolar membrane 4a is disposed. First bipolar membrane 4a is disposed so that its anion exchange membrane 2 faces the anion exchanger (anion exchange layer).

As shown in FIG. 7(d), in the second small deionization chamber in the deionized water producing apparatus (Comparative Example 5), only second bipolar membrane 4b is disposed. Second bipolar membrane 4b is disposed so that its cation exchange membrane 3 faces the cation exchanger (cation exchange layer).

Conditions in this comparison test, including specifications, the rates of passage of water and the type of supplied water, common to the example of the present invention and the comparative examples are as shown below. CER is an abbreviation of the cation exchanger (Cation Exchange Resin) and AER is an abbreviation of the anion exchanger (Anion Exchange Resin).

Cathode chamber: 100×300×4 mm in size, filled with AER
Anode chamber: 100×300×4 mm in size, filled with CER
Cathode-side first small deionization chamber and anode-side first small deionization chamber: 100×300×8 mm in size, filled with AER
Cathode-side second small deionization chamber and anode-side second small deionization chamber: 100×300×8 in size, mm filled with AER/CER (stacked)
Concentration chamber: size 100×300×4 mm in size, filled with AER
Deionization chamber flow rate: 20 L/h
Concentration chamber flow rate: 2 Uh
Electrode chamber flow rate: 10 L/h
Water supplied to deionization chamber and concentration chamber: one-stage RO permeate water with 10±1 μS/cm
Water supplied to electrode chamber: water treated in the deionization chamber
Applied current value: 3 A Each of the deionized water producing apparatuses in Example 3 and Comparative Examples 3 to 5 was continuously operated for 200 hours under the conditions shown above, and the operating voltage and the quality of the treated water at the start of the operation and after 200 hours from the start of the operation were measured. Table 2 shows the results of measurements.

TABLE 2

|  |  | Example 3 | Comparative Example 3 | Comparative Example 4 | Comparative Example 5 |
|---|---|---|---|---|---|
| Operating voltage [V] | At start of operation | 8.8 | 11.3 | 12.1 | 10.9 |
|  | After 200 hours | 16.2 | 121 | 52.4 | 61.2 |
| Electrical resistivity of treated water [MΩ·cm] | At start of operation | 17.9 | 17.8 | 17.7 | 17.7 |
|  | After 200 hours | 18.1 | 1.44 | 0.89 | 3.56 |

As shown in Table 2, there were no large differences in operating voltage and electrical resistivity of the treated water between the example of the present invention and the comparative examples at the start of the operation. However, after continuous operation for 200 hours, large deference in operating voltage and electrical resistivity of the treated water was observed. More specifically, while the operating voltage after operation for 200 hours in Example 3 was 16.2 V, the operating voltages in Comparative Examples 3 to 5 were increased to 50 to 120V. Also, while the electrical resistivity of the treated water after the operation for 200 hours in Example 3 was 18.1 MΩ·cm, the electrical resistivities in Comparative Examples 3 to 5 were 1 to 4 MΩ·cm. From these results, it was confirmed that an uneven flow of a current can be prevented by providing a bipolar membrane on each of the portions at which a water-splitting reaction occurs, that an increase in operating voltage and a reduction in the purity of treated water can be prevented thereby, and that high-purity deionized water can be produced.

The present embodiment has been described with respect to the arrangement in which a bipolar membrane is provided on the ion exchange membrane. However, part of the ion exchange membrane may be replaced with a bipolar membrane. By this replacement, the same effects and advantages as those described above can also be achieved. For example, the upper half of first cation exchange membrane c1 shown in FIG. 6 (the region in contact with the anion exchanger in cathode-side second small deionization chamber D-2) may be replaced with the bipolar membrane. Also, the lower half of second anion exchange membrane (intermediate ion exchange membrane) a2 shown in FIG. 6 (the region in contact with the cation exchanger in cathode-side second small deionization chamber D-2) may be replaced with the bipolar membrane.

Examples of the anion exchanger used in the deionized water producing apparatus according to the present invention include an ion exchange resin, ion exchange fibers, and a monolithic porous ion exchanger. The ion exchange resin that is most widely used may be preferably used as the anion exchanger. Examples of types of anion exchanger include a weakly basic anion exchanger and a strongly basic anion exchanger. Examples of the cation exchanger include an ion exchange resin, ion exchange fibers, and a monolithic porous ion exchanger. The ion exchange resin that is most widely used may be preferably used as the cation exchanger. Examples of types of cation exchanger include a weakly acidic cation exchanger and a strongly acidic cation exchanger.

The invention claimed is:

1. An electrodeionization apparatus for producing deionized water comprising at least one deionization treatment unit provided between a cathode and an anode that are opposite to each other, said deionization treatment unit including a deionization chamber and a pair of concentration chambers placed adjacent to said deionization chamber on opposite sides thereof and filled with anion exchangers, wherein said deionization chamber is partitioned by an ion exchange membrane into a first small deionization chamber adjacent to one of said pair of concentration chambers and a second small deionization chamber adjacent to the other of said pair of concentration chambers;

wherein said first small deionization chamber is filled with an anion exchanger, and wherein said second small deionization chamber is filled with an anion exchanger and a cation exchanger in a sequence such that the ion exchanger, through which water that is to be treated finally passes, is the anion exchanger.

2. The electrodeionization apparatus for producing deionized water according to claim 1, wherein one anion exchange layer is formed in said first small deionization chamber, and wherein at least one anion exchange layer and at least one cation exchange layer are stacked in said second small deionization chamber in a sequence such that the ion exchanger, through which the water that is to be treated finally passes, is the anion exchanger.

3. The electrodeionization apparatus for producing deionized water according to claim 2, wherein two anion exchange layers and two cation exchange layers are alternately stacked in said second small deionization chamber.

4. The electrodeionization apparatus for producing deionized water according to claim 1, wherein flow channels are formed so that a direction along which the water to be treated flows into said second small deionization chamber and a direction along which concentrated water flows into said concentration chambers are opposite to each other.

* * * * *

UNITED STATES PATENT AND TRADEMARK OFFICE
CERTIFICATE OF CORRECTION

PATENT NO. : 8,871,073 B2
APPLICATION NO. : 13/701819
DATED : October 28, 2014
INVENTOR(S) : Kazuya Hasegawa It is certified that error appears in the above-identified patent and that said Letters Patent is hereby corrected as shown below:

In The Specification

In column 1 at line 67, Change "OH)." to --$OH^-$).--.

In column 13 at line 60, Change "Nat" to --$Na^+$,--.

In column 14 at line 6, Before "second" delete "1.0".

In column 19 at line 67, Change "10 Uh" to --10 L/h--.

In column 22 at line 25 (approx.), Change "2 Uh" to --2 L/h--.

Signed and Sealed this
Twenty-sixth Day of January, 2016

Michelle K. Lee
*Director of the United States Patent and Trademark Office*